US006996221B1

(12) United States Patent
Baiyor et al.

(10) Patent No.: US 6,996,221 B1
(45) Date of Patent: Feb. 7, 2006

(54) APPARATUS, METHOD AND SYSTEM FOR PROVIDING TELECOMMUNICATION CONFERENCING SERVICES IN A MULTIPLE LEG TELECOMMUNICATION SESSION

(75) Inventors: Robert John Baiyor, Naperville, IL (US); Giacomo Bellomo, Morris Township, NJ (US); Deborah Thomas Earl, Naperville, IL (US); Harold Robert Smith, Jr., Oakbrook Terrace, IL (US); Thomas Dale Strom, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/455,623

(22) Filed: Dec. 7, 1999

(51) Int. Cl.
 H04M 3/42 (2006.01)
(52) U.S. Cl. .......................... 379/202.01; 379/205.01; 379/206.01
(58) Field of Classification Search ........... 379/202.01, 379/205.01, 206.01
 See application file for complete search history.

(56) References Cited

U.S. PATENT DOCUMENTS

| | | | | |
|---|---|---|---|---|
| 5,206,901 A | * | 4/1993 | Harlow et al. ......... | 379/207.07 |
| 5,329,578 A | * | 7/1994 | Brennan et al. ....... | 379/211.03 |
| 5,583,925 A | * | 12/1996 | Bernstein ............... | 379/202.01 |
| 5,644,624 A | | 7/1997 | Caldwell ..................... | 379/69 |
| 5,724,411 A | * | 3/1998 | Eisdorfer et al. ...... | 379/211.03 |
| 5,802,160 A | * | 9/1998 | Kugell et al. .......... | 379/211.04 |
| 6,408,173 B1 | * | 6/2002 | Bertrand et al. ............ | 455/405 |
| 6,697,478 B1 | * | 2/2004 | Meldrum et al. ...... | 379/211.04 |

* cited by examiner

*Primary Examiner*—Ahmad F. Matar
*Assistant Examiner*—Quynh H. Nguyen

(57) ABSTRACT

The system, apparatus and method of the present invention provide telecommunication conferencing services in a multiple leg telecommunication session. One of the system embodiments includes a database and a switching center. The database has stored in a memory a plurality of secondary directory numbers and a conference parameter associated with a primary directory number. The switching center has an interface for receiving an incoming call leg designating the primary directory number and for determining whether the primary directory number and its associated plurality of secondary directory numbers are configured for a conference mode. When so configured for the conference mode, the switching center includes further instructions to process and route each outgoing call leg associated with each secondary directory number of the plurality of secondary directory numbers to form a plurality of outgoing call legs, to monitor answering of the plurality of outgoing call legs, and to connect an answered outgoing call leg, of the plurality of outgoing call legs, to the incoming call leg for a multiple leg telecommunication conferencing session.

30 Claims, 5 Drawing Sheets

APPARATUS, METHOD AND SYSTEM FOR PROVIDING TELECOMMUNICATION CONFERENCING SERVICES IN A MULTIPLE LEG TELECOMMUNICATION SESSION

CROSS-REFERENCE TO RELATED APPLICATIONS

This application is related to Baiyor et al., U.S. patent application Ser. No. 09/094,837, entitled "Apparatus, Method And System For Controlling The Start Of Alerting Of Multiple Leg Telecommunication Sessions", filed Jun. 15, 1998, commonly assigned to Lucent Technologies, Inc., and incorporated by reference herein, with priority claimed for all commonly disclosed subject matter (the "first related application").

This application is related to Baiyor et al., U.S. patent application Ser. No. 09/097,334, entitled "Apparatus, Method And System For Controlling Secondary Treatment By a Distant Switch Of Multiple Leg Telecommunication Sessions", filed Jun. 15, 1998, commonly assigned to Lucent Technologies, Inc., and incorporated by reference herein, with priority claimed for all commonly disclosed subject matter (the "second related application").

This application is related to Baiyor et al., U.S. patent application Ser. No. 09/097,527, entitled "Apparatus, Method And System For Providing Information To A Called Party In Multiple Leg Telecommunication Sessions", filed Jun. 15, 1998, commonly assigned to Lucent Technologies, Inc., and incorporated by reference herein, with priority claimed for all commonly disclosed subject matter (the "third related application").

This application is related to Baiyor et al., U.S. patent application Ser. No. 09/342,499, entitled "Apparatus, Method And System For Providing Variable Alerting Patterns For Multiple Leg Telecommunication Sessions", filed Jun. 29, 1999, commonly assigned to Lucent Technologies, Inc., and incorporated by reference herein, with priority claimed for all commonly disclosed subject matter (the "fourth related application").

This application is related to Baiyor et al., U.S. patent application Ser. No. 09/350,577, entitled "Apparatus, Method And System For Providing Call Progress Information For Multiple Leg Telecommunication Sessions For Intelligent Network Services", filed Jul. 9, 1999, commonly assigned to Lucent Technologies, Inc., and incorporated by reference herein, with priority claimed for all commonly disclosed subject matter (the "fifth related application").

This application is related to Baiyor et al., U.S. patent application Ser. No. 09/350,439, entitled "Apparatus, Method And System For Providing Variable Termination Patterns For Multiple Leg Telecommunication Sessions", filed Jul. 9, 1999, commonly assigned to Lucent Technologies, Inc., and incorporated by reference herein, with priority claimed for all commonly disclosed subject matter (the "sixth related application").

This application is related to Baiyor et al., U.S. patent application Ser. No. 09/404,901, entitled "Apparatus, Method And System For Subscriber Control Of Timed And Regional Membership In Multiple Member Termination Groups For Multiple Leg Telecommunication Sessions", filed Sep. 24, 1999, commonly assigned to Lucent Technologies, Inc., and incorporated by reference herein, with priority claimed for all commonly disclosed subject matter (the "seventh related application").

FIELD OF THE INVENTION

The present invention relates in general to telecommunication systems and services, and more particularly, to an apparatus, method and system for providing telecommunication conferencing services in a multiple leg telecommunication session.

BACKGROUND OF THE INVENTION

Various telecommunication systems and services are currently available which provide for telecommunication conferencing, such as the capability for participation in a single communication session by multiple parties, from multiple different locations on separate communication lines. Many telephone systems include such conferencing capabilities, but typically require significant coordination and advanced planning, and may significantly limit the conference to a small number ("N") of different locations, lines or parties.

A common telecommunication conferencing service requires the advance reservation of a conference bridge, along with obtaining a special, central directory number and access code for the conference. To participate in the conference, conference members ("conferees") are required to place independent ingoing calls (or legs) to this special conference directory number given by a service provider. Once each call leg is made and the conferee enters a correct access code, then that call leg is connected to a conference bridge. In this type of telecommunication conferencing, the conference bridge must be reserved ahead of time with the service provider, by a coordinating conference member ("coordinator"). The coordinator must obtain a corresponding special conference directory number and access code, and further must communicate this information to all other conferees.

Other teleconferencing systems, such as N-way calling, allow a coordinator to bridge other conferees into a conference bridge sequentially, one conferee at a time. The coordinator must place independent outgoing call legs to each conferee, wait for the conferee to answer, and connect/bridge the conferee into the conference bridge. This process is repeated for each additional conferee. While this type of conference need not be prearranged with a service provider, it nonetheless requires a substantial amount of time and effort on the part of the coordinator. Moreover, such N-way calling systems are typically limited to a maximum of six (6) conference members.

Other teleconferencing systems, while not limited to a small number of conference members, require the use of specialized, proprietary telecommunication equipment for all conference call legs. In addition, in these systems, complete two-way communication (full duplex) may not be provided, with service being limited to either receiving (listening) or transmitting (talking) at any given time (half duplex). For example, in some of these systems, a conferee desiring to speak must press a "talk" button in order to verbally participate in the conference.

As a consequence, a need remains for an apparatus, method and system to provide for telecommunication conferencing services. Such conferencing services should be automatic and user friendly, without requiring advanced reservations or planning, and without requiring special conference directory numbers and access codes. Such an apparatus, method and system should be capable of full duplex communication, allowing a conferee to both speak and listen at the same time during a conference call. Such an apparatus, method and system should also be capable of implementation utilizing pre-existing customer premise equipment, without requiring special proprietary equipment.

SUMMARY OF THE INVENTION

In accordance with the present invention, an apparatus, method and system are illustrated which provide for telecommunication conferencing services in a multiple leg telecommunication session. The invention utilizes a special directory number ("DN") referred to as a pilot directory number ("pilot DN") or as a primary directory number ("primary DN"). A subscriber, or other user of flexible alerting or other multi-leg communications, typically predefines a group of other directory numbers, referred to herein as secondary DNs, which are to be associated with the pilot or primary DN (as an alerting group), such that when a call is placed to the primary DN, all of the secondary DNs are alerted. Also in accordance with the present invention, the subscriber may also specify a conference mode for the alerting group, utilizing a new parameter referred to as conference parameter. This listing of secondary DNs and conference parameter, as the alerting group associated with the primary DN, is preferably stored in a database such as a home location register.

An incoming call to the primary DN is processed by a switching center, such as a mobile switching center ("MSC"). The switching center obtains, from the database, the listing of secondary DNs and conference parameter associated with the primary DN. When the alerting group is configured for a conference mode, as indicated by the conference parameter, the switching center then processes and routes an outgoing call leg to each of the multiple different mobile or wireline secondary DNs of the user's predefined alerting group, creating a plurality of multiple different outgoing communication legs to these intended conference participants. As any of the plurality of outgoing call legs are answered by these intended conference participants, each answered outgoing call leg is connected to the incoming call leg to form the telecommunication conference session. Any of the outgoing call legs that are not answered within a predetermined period of time are released.

There are numerous and significant advantages of the present invention. First, once an alerting group (or primary DN) has been configured to include a conference mode, no advance system reservations or notifications are required to create a conference call. Second, other than the person who places the incoming call leg to the primary DN, the conference participants only need to answer their respective outgoing call legs, and do not each need to dial into a prearranged, reserved conference bridge. Third, all conference participants may be alerted together and alerted concurrently, rather than alerted individually and sequentially, with each participant individually joined into the conference. In addition, such conferencing of all outgoing call legs is performed automatically, without user involvement or intervention. Lastly, the conference participants may utilize pre-existing customer premise or mobile telecommunication equipment, and specialized or proprietary customer premise equipment is not required for this conferencing feature.

Numerous other advantages and features of the present invention will become readily apparent from the following detailed description of the invention and the embodiments thereof, from the claims and from the accompanying drawings.

DETAILED DESCRIPTION OF THE INVENTION

Figure 1A:
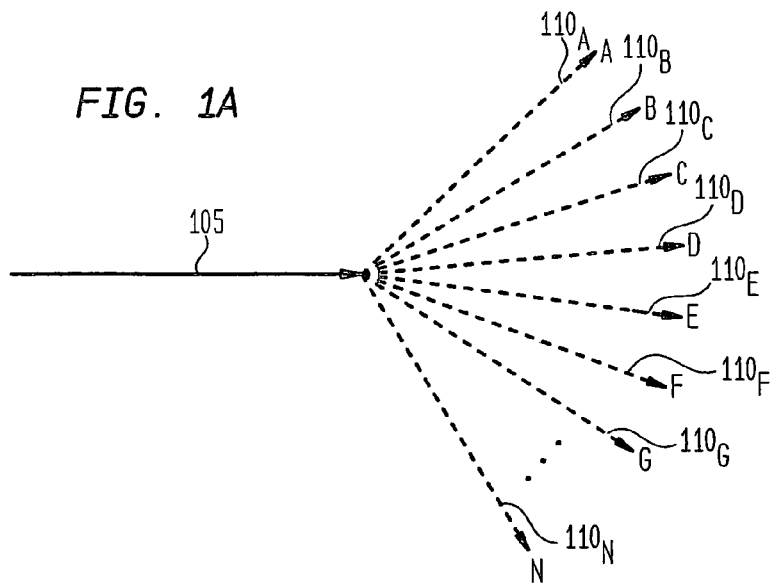
FIG. 1A is a graphical diagram illustrating an exemplary scheme for alerting multiple conference members in accordance with the present invention.

While the present invention is susceptible of embodiments in many different forms, there are shown in the drawings and will be described herein in detail specific embodiments thereof, with the understanding that the present disclosure is to be considered as an exemplification of the principles of the invention and is not intended to limit the invention to the specific embodiments illustrated.

As mentioned above, a need remains for an apparatus, method and system to provide for automatic telecommunication conferencing services. The present invention provides such automatic telecommunication conferencing services. In addition, the telecommunication conferencing services of the present invention do not require advanced reservations or planning, and do not require special conference directory numbers and access codes. The various embodiments of the present invention are capable of full duplex communication, and are capable of implementation utilizing pre-existing customer premise equipment, without requiring special proprietary equipment.

While not designed for conferencing services, the American National Standards Institute ("ANSI") has promulgated a wireless telecommunication specification, referred to as the ANSI-41 signaling interface specification for "flexible alerting", for multiple leg telecommunication sessions, as a terminating feature or terminating call service. In this specification, a call is placed to a special directory number ("DN") referred to as a pilot directory number ("pilot DN") or as a primary directory number ("primary DN"). A subscriber or other user of flexible alerting or other multi-leg communications, typically predefines a group of other directory numbers, referred to herein as secondary DNs, which are to be associated with the pilot or primary DN, such that when a call is placed to the primary DN, all of the secondary DNs are alerted. Such a list or grouping may be referred to as a flexible alerting group, or more broadly as an alerting group or a secondary DN group, (and may also be referred to as a termination group or list when incorporated in certain response messages discussed below). The incoming call to the pilot DN is then to be processed by a mobile switch, which then directs the incoming call to the multiple different mobile or wireline secondary DNs of the user's predefined alerting group, creating multiple different outgoing communication legs to these differing and independent directory numbers.

Under the ANSI-41 specification, however, whichever outgoing call leg is first to answer will receive the call and be connected to the calling party, with the other outgoing call legs released (i.e., dropped or torn down, with their corresponding alerting ceased). As a consequence, the ANSI-41 specification provides merely for a single connection between the incoming call leg and one of the outgoing call legs, and does not provide for multiple leg telecommunication conferencing sessions.

In accordance with the present invention, however, portions of various features of the ANSI-41 specification are utilized to enable conferencing services. As discussed in greater detail below, a primary DN, with its associated secondary DNs, may be designated for conferencing services. Also as discussed in greater detail below, this designation may occur in a variety of ways, such as utilizing the subscriber control features in accordance with the invention of the seventh related application. In accordance with the present invention, when configured for a conferencing mode, an incoming call leg to the primary DN, placed by one of the conference participants (such as the coordinator), will generate multiple outgoing call legs to all of the associated secondary DNs, with each such secondary DN corresponding to a conference participant.

Contrary or in addition to the ANSI-41 specification, rather than releasing all remaining outgoing call legs after one of the outgoing call legs has been answered, in accordance with the present invention, all answered outgoing call legs are connected to the incoming call leg for a full duplex conference session. While the conference session is being formed, as the various outgoing call legs may be in the process of being answered, all remaining outgoing call legs continue to be alerted. If any outgoing call legs remain unanswered after a predetermined period of time has elapsed, then the unanswered outgoing call legs are released or torn down. With all such answering outgoing call legs being connected to the incoming call leg, a full duplex telecommunication conference session is created.

Significant features of the present invention may be readily apparent. First, once an alerting group (or corresponding primary DN) has been configured to include a conference mode, no advance system reservations or notifications are required to create a conference call. Second, other than the person who places the incoming call leg to the primary DN, the conference participants only need to answer their respective outgoing call legs, and do not each need to dial into a pre-arranged, reserved conference bridge. Third, all conference participants may be alerted together and alerted concurrently, rather than alerted individually and sequentially, and joined into the conference one at a time (see also, the invention disclosed in the first related application). Lastly, the conference participants may utilize pre-existing customer premise or mobile telecommunication equipment, and specialized or proprietary customer premise equipment is not required for this conferencing feature.

FIG. 1A is a graphical diagram illustrating an exemplary scheme for alerting multiple conference members, in accordance with the present invention. As illustrated in FIG. 1A, an incoming call leg 105 originating from a conference coordinator ("coordinator"), designating a primary DN, is processed by a switch to generate multiple outgoing call legs 110 to a predefined alerting group of "N" secondary DNs corresponding to N recipients, all of whom are potential conference members. More particularly, the incoming call leg 105 has been processed to generate multiple outgoing call legs to: secondary $DN_A$, corresponding to outgoing call leg $110_A$ to recipient "A"; secondary $DN_B$, corresponding to outgoing call leg $110_B$ to recipient "B"; secondary $DN_C$, corresponding to outgoing call leg $110_C$ to recipient "C"; secondary $DN_D$, corresponding to outgoing call leg $110_D$ to recipient "D"; secondary $DN_E$, corresponding to outgoing call leg $110_E$ to recipient "E"; secondary $DN_F$, corresponding to outgoing call leg $110_F$ to recipient "F"; secondary $DN_G$, corresponding to outgoing call leg $110_G$ to recipient "G"; and so on, through secondary $DN_N$, corresponding to outgoing call leg $110_N$ to recipient "N".

Figure 1B:
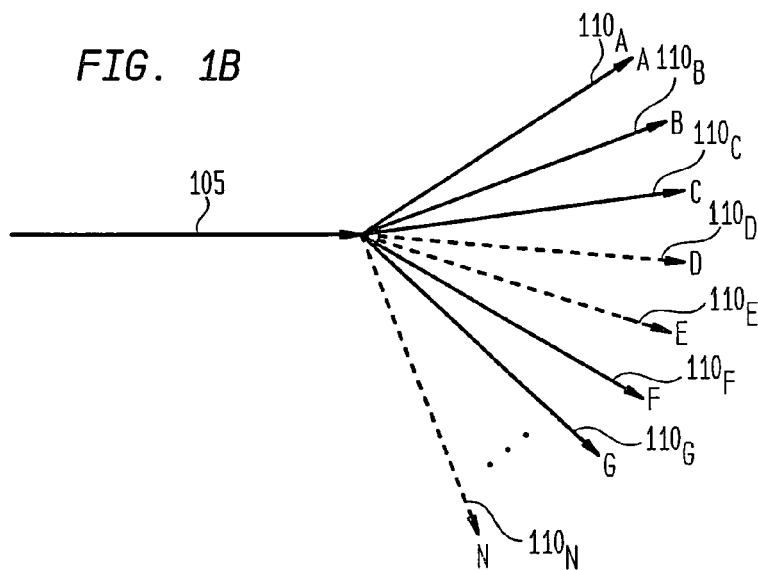
FIG. 1B is a graphical diagram illustrating the exemplary scheme for alerting multiple conference members, as outgoing call legs are being answered, in accordance with the present invention.

FIG. 1B is a graphical diagram illustrating the exemplary scheme for alerting multiple conference members, as outgoing call legs are being answered, in accordance with the present invention. As conference members begin to answer their respective outgoing call legs (illustrated by solid lines in FIG. 1B), the outgoing call legs are connected to the incoming call leg 105 for the conference session. As illustrated in FIG. 1B, outgoing call legs $110_A$, $110_B$, $110_C$, $110_F$, and $110_G$, have been answered and connected to incoming call leg 105. Rather than releasing the unanswered outgoing call legs when one of the outgoing call legs is answered, however, in accordance with the present invention, the remaining unanswered outgoing call legs continue to be alerted until a predetermined period of time has elapsed (illustrated as dashed lines in FIG. 1B).

Figure 1C:
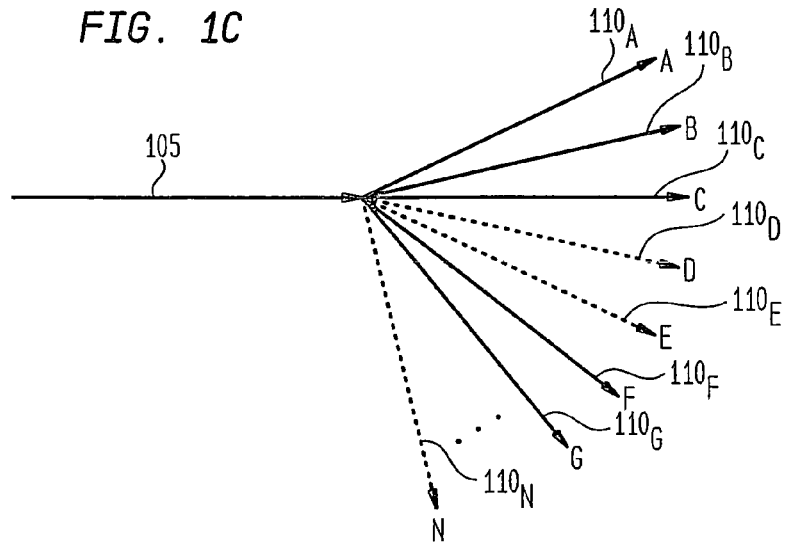
FIG. 1C is a graphical diagram illustrating the creation of a conference session, from the exemplary scheme for alerting multiple conference members, after a no answer time period has elapsed.

FIG. 1C is a graphical diagram illustrating the creation of a conference session, from the exemplary scheme for alerting multiple conference members, after the no answer time period has elapsed. At this time, all answering outgoing call legs (illustrated as answering outgoing call legs $110_A$, $110_B$, $110_C$, $110_F$, and $110_G$) have been independently answered at various times (prior to the expiration of the NAT period, discussed below) and connected to incoming call leg 105 for a conference session. As mentioned above, alerting had continued on all unanswered outgoing call legs for a predetermined period of time, referred to as a no answer time ("NAT") period. As illustrated in FIG. 1C, this NAT period has elapsed or expired, and following such expiration, alerting is ceased and any and all unanswered call legs are released (i.e., dropped or torn down), illustrated as released outgoing call legs $110_D$, $110_E$, and $110_N$ (dotted lines).

In accordance with the present invention, a subscriber (who may or may not be the conference coordinator) predefines one or more conferencing groups, such as providing a list of all directory numbers which are to be included in any particular conferencing group. For example, a subscriber may define various conferencing groups which are related to business, and others which are related to personal matters, such as home, family and friends, referred to herein as subscriber groups. Moreover, the subscriber may update or change such subscriber groups as necessary or desirable. The recipients of each outgoing call leg (potential conference members) within each of these subscriber groups may utilize any type of telecommunication equipment, such as mobile or cellular handsets or ordinary PSTN ("public switched telephone network") telephones. The conference recipients may also be located anywhere, and may participate in the conference via any type of network or interface, such as PSTN, satellite, mobile, cellular (analog, TDMA, CDMA, etc.).

Figure 2:
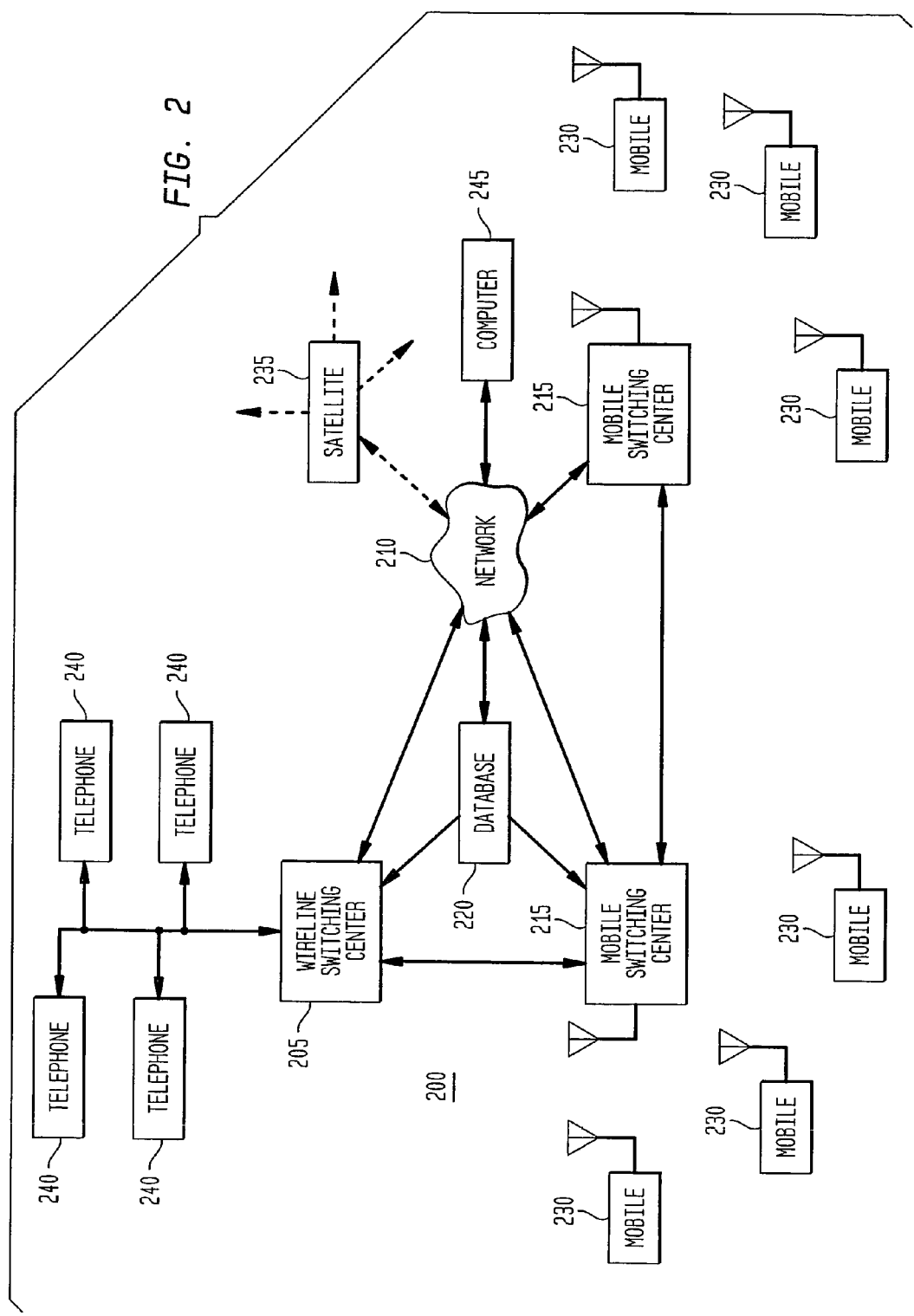
FIG. 2 is a block diagram illustrating a first system embodiment in accordance with the present invention.

FIG. 2 is a block diagram illustrating a first system embodiment 200 in accordance with the present invention. The system 200 includes one or more mobile switching centers ("MSCs") 215 and one or more wireline switching centers 205, which may also be connected via trunk and signaling lines to each other and to a broader network 210, such as a PSTN or ISDN network providing multiple telecommunication connections to other locations, such as providing a link to satellite 235. The system 200 also includes a database 220, which is preferably connected or coupled to a wireline switching center 205 and to a MSC 215. A database 220 may also be directly included or integrated within the various switching centers 205 and 215. The system 200 may also have a network (such as internet) connection to a computer 245 (or other network communication device), to provide the subscriber interactivity mentioned above and as discussed in the seventh related application.

The wireline switching center 205 is also generally connected to a plurality of telephones 240 or other customer premise equipment, while the MSCs 215 (via base stations or other wireless transceivers, not separately illustrated) typically have a wireless link to the various mobile units 230, such as cellular telephones within a particular geographic region, for voice and data communication and for the subscriber interactivity mentioned above and as discussed in the seventh related application. In addition, while the wireline and mobile switching centers 205 and 215 are usually physically separated due to regulatory and other historical reasons, these switching centers may also be combined into one or more switching centers having both wireline and wireless functionalities.

The wireline switching center 205 and MSC 215, as illustrated in FIG. 2, also preferably include bridging functionality, as an integrated feature, to connect all answered call legs to the incoming call leg designating a primary DN, for conference service. Such bridging functionality is separately illustrated in the system of FIG. 3.

Continuing to refer to FIG. 2, an incoming call designating a primary DN may be received by either the wireline switching center 205 or one of the mobile switching centers 215. Corresponding to the primary DN, the switching center 205 or 215 then transmits a request to database 220 for an alerting list containing, among other things, the secondary directory numbers associated with the primary DN. In accordance with the present invention, the database 220 transmits a response to the corresponding switching center 205 or 215, containing or listing the associated secondary DNs, a corresponding no answer time parameter (NAT), and a new parameter indicating that the multiple leg communication session is to be a conference session, referred to herein as conference (or conference call) ("CC") parameter. (In accordance with the various related inventions, the response may also include corresponding timing parameters (one set of parameters for each associated secondary DN), such as each of their timing delay parameters (ring start adjustment time ("RSAT") values)). A significant feature of the present invention, and a significant departure from the ANSI-41 specification, is the use of this new conference (CC) parameter to designate the telecommunication session as a conference session and to distinguish the intended conference session from other forms of multiple leg communication sessions (in which outgoing call legs may be released following an answer). In the preferred embodiment, the absence of the conference parameter in the response message is a default setting indicating a non-conference flexible alerting session.

When the response includes corresponding timing parameters, the switching center 205 or 215 may use the timing parameters to differentially process and route each outgoing call leg associated with each secondary directory number. More specifically, the switching center 205, 215 waits an initial predetermined period of time, determined by a smallest timing delay parameter of a plurality of corresponding timing delay parameters, and following the initial predetermined period of time routes a first outgoing call leg to a first secondary directory number, of the plurality of secondary directory numbers, corresponding to the smallest timing delay parameter. The switch then waits a subsequent period of time, determined by a next smallest timing delay parameter of the plurality of corresponding timing delay parameters, and following the subsequent predetermined period of time, routes an outgoing call leg to a second secondary directory number, of the plurality of secondary directory numbers, corresponding to the next smallest timing delay parameter, until all outgoing call legs corresponding to the plurality of secondary directory numbers have been routed. This differential processing can result in concurrent or simultaneous alerting of each of the plurality of secondary call legs by compensating for the fact that some call legs, due to their nature may be terminated more quickly than other call legs which may be undesirable in some circumstances.

When the switching center 205 or 215 receives from the database 220 a response message containing a conference parameter and the other information mentioned above, the switch processes the multiple leg telecommunication session as a telecommunication conferencing call, reserving capacity of the bridging functionality of the switching center, in order to subsequently bridge all answered outgoing call legs to the incoming call leg. The switching center begins to process and route the associated outgoing call legs corresponding to the secondary DNs, as illustrated above with respect to FIG. 1A and as discussed in the related applications. In accordance with the present invention, as an outgoing call leg may be answered, the switching center 205 or 215 connects the answered outgoing call leg to the incoming call leg via the bridging functionality. Alerting continues on the unanswered call legs, rather than being released or dropped, as illustrated in FIG. 1B. The switching center (205 or 215) continues to monitor each remaining outgoing call leg until the sooner to occur of either the call leg being answered (and then connected to the incoming call leg via a bridging functionality), or the expiration of the no answer time parameter (and the release of the unanswered call leg), as illustrated above with respect to FIG. 1C.

Figure 3:
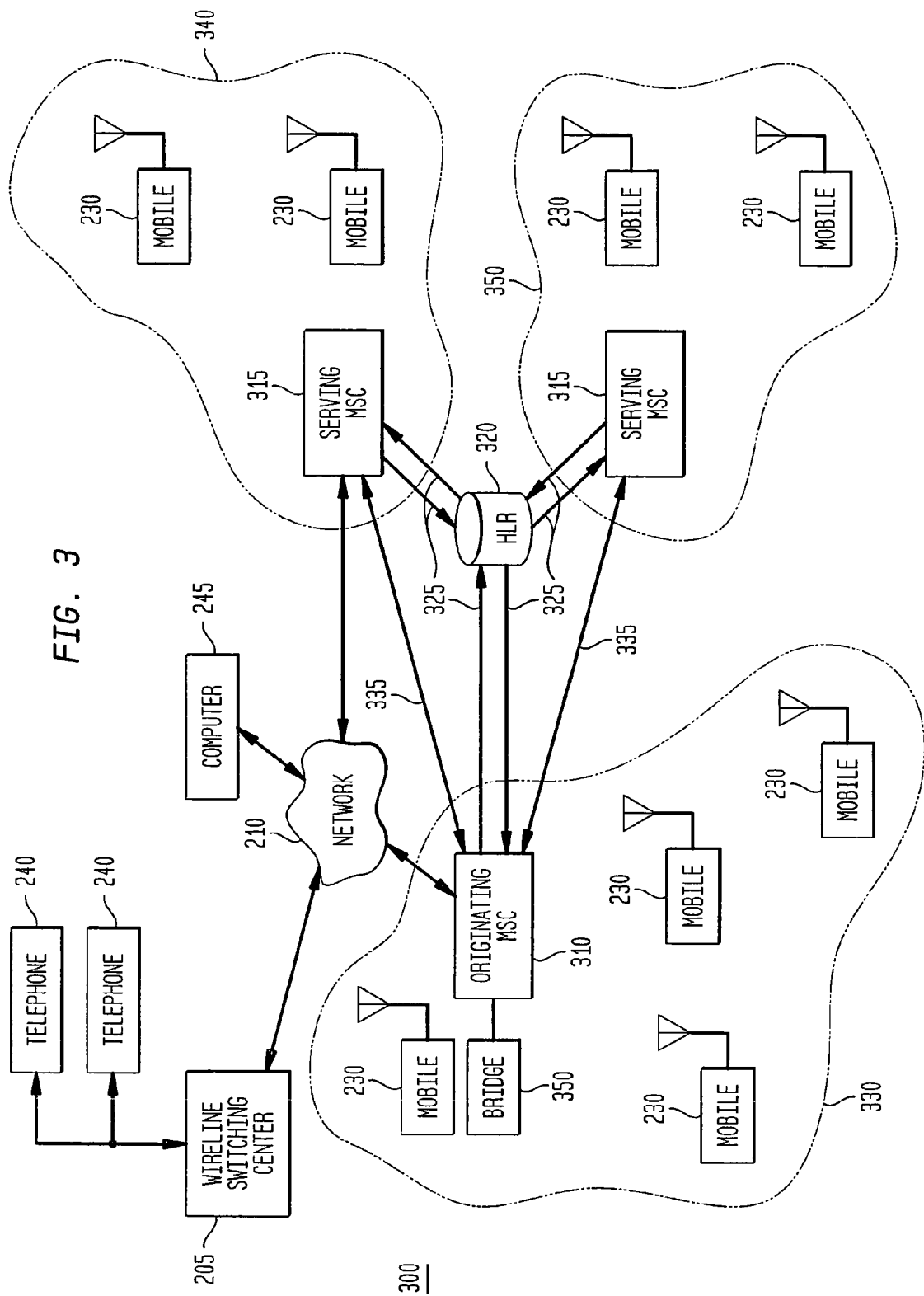
FIG. 3 is a block diagram illustrating a second system embodiment in accordance with the present invention.

FIG. 3 is a block diagram illustrating a second, preferred system embodiment 300 in accordance with the present invention, such as for ANSI-41 flexible alerting. In this system 300, the mobile switching centers 215 are represented by two types of MSCs. The first type of MSC, referred to as an incoming call or originating MSC 310, directly provides service to the mobile units 230 within its designated or predetermined geographic region 330. The second type of MSC, referred to as a serving MSC 315, provides service to mobile units 230 which have traveled or roamed into its designated or predetermined geographic regions 340 or 350. A home location register ("HLR") 320 is utilized in this preferred embodiment, among other things, to implement the database 220 and other ANSI-41 signaling functionality. The HLR 320 may be a stand-alone HLR, as illustrated, or may be integrated within the various switching centers. The various MSCs 310 and 315 are preferably connected to the HLR 320 via ANSI-41 signaling interfaces and corresponding links 325. As in the system of FIG. 2, the various MSCs 310 and 315 are also connected or coupled to a wireline switching center 205 and to a network 210, for multiple network connections, such as PSTN, ISDN, or satellite connections. Also as in the system of FIG. 2, the various telephones 240 and mobile units 230, or computer 245, may be utilized for subscriber input of specifications for conference member participation in a given teleconference session.

For greater conference capacity in the system 300, a separate conference bridge 350 coupled to the originating MSC 310 is also utilized to connect the answered outgoing call legs to the incoming call leg for a conference session. As in the system 200, the originating MSC 310 may also include internal or integrated bridging functionality, typically for lower capacity conferencing sessions.

When an originating MSC 310 receives an incoming call designating a primary DN, the originating MSC 310 transmits a query or other message to an HLR 320. Such a query is typically in the form of a data packet, and includes a reference to the primary DN. While the operation of the system 300 is explained with reference to an originating MSC 310, it should be understood that any MSC 215, at any given time, may be serving as either or both an originating MSC 310 or a serving MSC 315. The incoming call to the originating MSC 310 may be a wireless call, from one of the mobile units 230, or may be a wireline call originating from the network 210, such as a PSTN call. In the preferred embodiment, utilizing the ANSI-41 specification, the query transmitted by the originating MSC 310 to the HLR 320 is a "LocationRequest", which is an operation used by an originating MSC 310 to obtain call treatment instructions from the HLR 320, and is initiated with a "TCAP INVOKE (LAST)," carried by a TCAP QUERY WITH PERMISSION package, and includes corresponding mandatory and optional parameters as defined in the ANSI-41 specification for a LocationRequest INVOKE, such as pilot DN, billing identification, and originating MSC identifier.

Utilizing its database, the HLR 320 first determines whether the primary DN is for a flexible alerting group, and if so, prepares a response or other message containing or listing the secondary DNs (of the coordinator's defined alerting group) which are to be alerted currently. In the preferred embodiment, for the response data packet, the variable subset or listing of secondary DNs is provided within a TerminationList of an ANSI-41 compatible LocationRequest RETURN RESULT. In addition, the HLR 320 determines whether the primary DN is currently configured for a conference mode, and if so, includes a conference parameter within the response message, such as the ANSI-41 compatible LocationRequest RETURN RESULT. In the preferred embodiment, the conference parameter is encoded utilizing the eight-bit field of a DMH_RedirectionIndicator parameter of a LocationRequest RETURN RESULT. When the DMH_RedirectionIndicator is set to a predefined value or default value (17 in the preferred embodiment), a non-conference flexible alerting session is indicated, such that the originating MSC 310 will, after a first answer of an outgoing call leg, drop the remaining outgoing call legs. When the DMH_RedirectionIndicator is set to a different predefined value or non-default value, conference session is indicated, such that the originating MSC 310 will connect answering outgoing call legs to the incoming call leg, and drop the unanswered outgoing call legs only after the expiration of the no answer time period. In addition, as disclosed in the related applications, the response may contain, for each selected secondary DN which is to be alerted, corresponding routing and answering parameters, such as RSAT values, and termination triggers. The HLR 320 then transmits, back to the originating MSC 310, a response data packet having a conference parameter and having a listing of secondary DNs, selected in accordance with the membership parameters, with each of their corresponding routing and answering parameters (RSAT values, NAT values, and termination triggers).

The originating MSC 310, utilizing the information contained in the response data packet (the conference parameter, the listing of secondary DNs and each of their corresponding routing and answering parameters), reserves bridging capacity for the conference call, either on a conference bridge 350 or within internal bridging functionality. The MSC 310 then begins to differentially process and route each outgoing call leg corresponding to a secondary DN. In accordance with related inventions, such processing and routing may be delayed according to each secondary DN's respective timing delay parameter, to provide concurrent alerting (approximately) for all of these secondary DNs. If and when one of the outgoing call legs is answered, the originating MSC 310 connects the answered outgoing call leg to the incoming call leg via the conference bridge 350 or its internal bridging capacity. The originating MSC 310 continues to provide for alerting of remaining outgoing call legs prior to expiration of one or more corresponding no answer time parameters. Following such expiration, the remaining unanswered outgoing call legs are released, and alerting is ceased. In the preferred embodiment, the conference session is maintained between and among each call leg until the penultimate call leg terminates the session (goes on hook).

Continuing to refer to FIG. 3 and in accordance with related inventions, the processing and routing of these outgoing call legs is typically divided into four groups: (1) wireline secondary DNs; (2) wireless secondary DNs in a geographical location 330 served by the originating MSC 310; (3) wireless secondary DNs in a geographical location (340 or 350) served by a serving MSC 315; and (4) wireless secondary DNs served from a location in which its data or other information is located on a different HLR, i.e., on an HLR other than HLR 320, such as an HLR of a different service provider. As disclosed in the various related applications, additional messaging (such as routing requests and responses) may occur for (roaming) wireless secondary DNs served by a serving MSC 315. In addition, timing delay parameters may also be determined, at least initially, based upon these four groupings of the outgoing call legs.

Various alternatives are available as the various recipients begin to answer their corresponding outgoing call legs, depending upon the selected implementation of the service provider. First, as each such outgoing call leg may be answered, it may be immediately connected or bridged to the incoming call leg and any previously answered outgoing call legs. Second, all answering outgoing call legs may be connected or bridged together with the incoming call leg at approximately the same time. In the preferred embodiment, and as disclosed in the third related application, information may be provided to the various called parties to indicate any potential bridging delay or connection time lag which may be incurred in this connection or bridging process. For example, the MSC 310 or conference bridge 350 may generate an announcement to each of the recipients, such as "please hold for a conference call," followed by connecting the answered outgoing call legs when all outgoing call legs are answered.

As mentioned above and as disclosed in the seventh related application, in the preferred embodiment, the subscriber may interface with the HLR 320 to customize and vary the subscriber groups for any particular conference session. The interface may be by graphical user interface, by keypad of a telephone 240 or mobile unit 230, or by another user interface. Typically, the subscriber defines one or more alerting groups of secondary telephone numbers and initially defines the parameters for each secondary DN. In accordance with the present invention, one or more of these alerting groups may be designated as a conference group, with the corresponding primary DN thereby configured for a conference mode. This designation may also be dynamically varied, under subscriber control, via the various interface means mentioned above.

In addition, the originating MSC 310 may be directed (such as via an encoded parameter within the LocationRequest RETURN REQUEST) to track the unanswered and released outgoing call legs, creating a set of unanswered secondary DNs. The MSC 310 may then, after a (second) predetermined period of time, re-process and re-route second outgoing call legs to this set of unanswered secondary DNs, potentially creating a second set of outgoing call legs. Of this second set of outgoing call legs, answered outgoing call legs may be connected to the conference session already in progress, while outgoing call legs which have remained unanswered after the expiration of another no answer time period may be released. As a consequence, conference participants who may have initially missed their anticipated outgoing call legs may nonetheless be joined into the conference. This process of continuing to generate and connect additional outgoing call legs may continue to be repeated, according to subscriber specifications or input, or time parameters.

In the preferred embodiment, the originating MSC 310 only re-processes and re-routes unanswered and released outgoing call legs (contemplating that a recipient who terminates their call leg may be unable to participate and should not be called back) However, in other embodiments of the present invention, the MSC 310 may be directed to re-process and re-route the outgoing call legs which were unanswered and released as well as the outgoing call legs which were terminated by the recipient. In various other embodiments, the present invention may also provide the coordinator with an ability to personally bridge other conference members into the conference bridge sequentially, similarly to N-way calling described above. In other words, the coordinator during the conference call may be able to personally place another outgoing call leg to a new party, not originally part of the conference alerting group, and connect or bridge that party into the conference. As a consequence, the coordinator may be allowed to connect third parties into the conference who may have been initially (and possibly erroneously) not included in the conference alerting group or who may have been disconnected accidentally.

Figure 4:
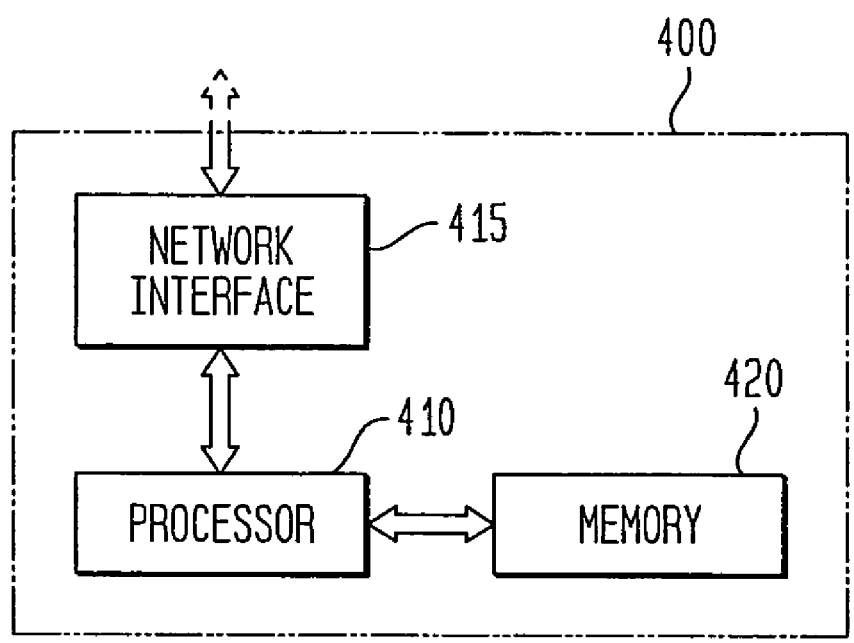
FIG. 4 is a block diagram illustrating an apparatus embodiment in accordance with the present invention.

FIG. 4 is a block diagram illustrating an apparatus embodiment 400 in accordance with the present invention. As discussed in greater detail below, such an apparatus 400 may be included within, or distributed among, an MSC (310 or 315) or HLR 320 of a system 300, or may be included within, or distributed among, a switching center 205 or 215 and database 220 of system 200. The apparatus 400 includes a network interface 415, a processor 410, and a memory 420. The network interface 415 is utilized to receive an incoming call leg to a pilot DN or primary DN, and to transmit the plurality of outgoing call legs to the secondary DNs associated with a primary DN. For example, in system 300, the network interface 415 may be coupled to the network 210 (via trunk and signaling lines) for transmission and reception of PSTN calls, and coupled (via trunk and signaling lines) to a base station for transmission and reception of wireless calls. The network interface 415 (or a second, ANSI-41 signaling interface, not separately illustrated) may also be utilized to receive and transmit messages, such as to receive or transmit a location request or query, and to receive or transmit a response message containing a listing of secondary DNs and a conference parameter (discussed below). The memory 420 is used to store information pertaining to primary DNs, associated secondary DNs and their membership parameters, the conference parameter, routing and answering parameters, other call placement and routing information, and the call progress information of the related inventions. The memory 420 may be a magnetic hard drive, an optical storage device, or any other type of data storage apparatus. The memory 420 also performs such information storage comparable to the information storage of the database 220 or HLR 320.

Continuing to refer to FIG. 4, the processor 410 may include a single integrated circuit ("IC"), or may include a plurality of integrated circuits or other components connected, arranged or grouped together, such as microprocessors, digital signal processors ("DSPs"), application specific integrated circuits ("ASICs"), associated memory (such as RAM and ROM), and other ICs and components. As a consequence, as used herein, the term processor should be understood to equivalently mean and include a single processor, or arrangement of processors, microprocessors, controllers, or some other grouping of integrated circuits which perform the functions discussed above and also discussed in detail below with reference to FIG. 5, with associated memory, such as microprocessor memory or additional RAM, ROM, EPROM or $E^2$PROM. The methodology of the invention, as discussed above with reference to FIGS. 1–3 and as discussed below with reference to FIG. 5, may be programmed and stored, in the processor 420 with its associated memory and other equivalent components, as a set of program instructions for subsequent execution when the processor 410 is operative (i.e., powered on and functioning).

As mentioned above, such an apparatus 400 may be included within, or distributed among, an MSC (310 or 315) or HLR 320 of a system 300, or may be included within, or distributed among, switching centers 205 or 215 and database 220 of system 200. For example, when included within the system 200, the various switching centers 205 and 215 may incorporate the database 220; in that event, the apparatus 400 may be completely included within either the wireline switching center 205 or the wireless switching center 215. Also for example, when included within the system 300, the apparatus 400 may distributed among the originating MSC 310 and the HLR 320, with the memory 420 incorporated within the HLR 320, with the processor 410 having components within the originating MSC 310 and the HLR 320, and with the network interface 415 incorporated within the MSC 310 (or 315). In such a distributed embodiment for the system 300, the apparatus 400 would also include corresponding ANSI-41 signaling interfaces within the originating MSC 310 and the HLR 320, for communication of the various requests and responses discussed above.

In summary, the apparatus 400 for multiple leg telecommunication conferencing sessions, includes: first a network interface 415 for reception of an incoming call leg designating a primary directory number and for transmission of a plurality of outgoing call legs; second, a memory 420 having a conference call parameter and a plurality of secondary directory numbers associated with the primary directory number; and third, a processor 410 coupled to the memory and the network interface. The processor, when operative, includes program instructions to process and route each outgoing call leg associated with each secondary directory number, of the plurality of secondary directory numbers. The processor 410 includes further instruction to monitor an answering of each outgoing call leg of the plurality of outgoing call legs, and for each answered outgoing call leg, to direct the connection of the answered outgoing call leg to the incoming call leg to form a conference session. In addition, the processor 410 includes further instructions, upon an expiration of a no answer time parameter, to release any unanswered outgoing call legs of the plurality of outgoing call legs.

Figure 5:
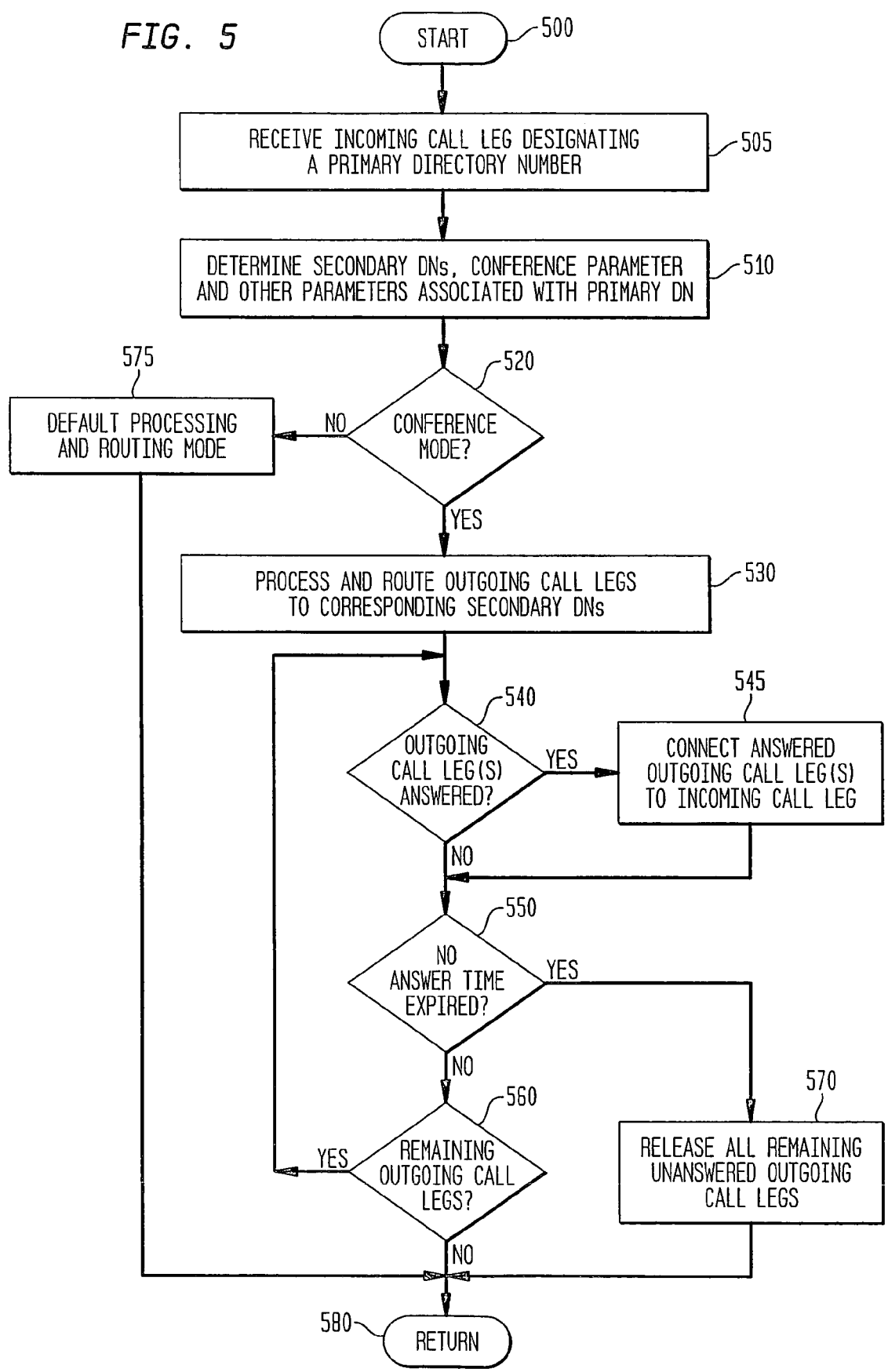
FIG. 5 is a flow diagram illustrating a method to provide telecommunication conferencing services in a multiple leg telecommunication session.

FIG. 5 is a flow diagram illustrating a method to provide telecommunication conferencing services in a multiple leg telecommunication session. Beginning with start step 500, the method begins with the reception of an incoming call leg designating a primary DN, step 505, such as a pilot DN of the ANSI-41 specification. Next, in step 510, the method determines all secondary DNs associated with the primary DN, determines whether the primary DN is currently configured for a conference mode, as well as determining any timing, routing, or no answer time parameters.

As indicated above, step 510 is usually performed in a database 220 of system 200 or HLR 320 of system 300, or within an apparatus 400 (which may be included within a database 220 or HLR 320 or otherwise distributed within one of the systems 200 or 300). In the preferred embodiment this step is performed through a query from the originating MSC 310 to the HLR 320, such as an ANSI-41 Location-Request. The HLR 320 receiving the query determines all secondary DNs and all parameters associated with the primary DN. The HLR 320 transmits, such as through ANSI-41 LocationRequest RETURN REQUEST, this information back to the MSC 310.

The MSC 310, upon receiving this information from the HLR 320, determines whether the incoming call leg is for a conference session, step 520. This may be done, as mentioned above, through a conference parameter encoded in the DMH_RedirectionIndicator in the preferred embodiment. When the alerting group (as specified by the primary DN) is not currently configured for a conference mode, as indicated by the conference parameter, then the method proceeds to step 575, and processes the incoming call leg according to its default or other designated mode, such as differentially processing, routing and monitoring each outgoing call leg as, for example, a flexible alerting telecommunication session in which only the first to answer outgoing call leg is connected to the incoming call leg.

When the alerting group is configured for a conference mode in step 520, the method proceeds to step 530 and processes and routes each outgoing call leg of the plurality of outgoing call legs corresponding to the secondary DNs of the alerting group. During this time, the method may also connect the incoming call leg to a conference bridge, when a conference bridge is utilized in the system 200 or 300. Following step 530, the method monitors each of the outgoing call legs to determine if a call leg has been answered, step 540. When any outgoing call leg has been answered in step 540, each such answered outgoing call leg is connected to the incoming call leg, step 545, such as via the conference bridge or other bridging functionality utilized in the system 200 or 300, forming the conference session. When in step 540 an outgoing call leg has not been answered, the method further determines whether a predetermined period of time has elapsed, as determined by the no answer time parameter, step 550. When the no answer time has not expired, the method determines whether there are remaining outgoing call legs to be monitored, step 560. When there are remaining outgoing call legs to be monitored in step 560, the method returns to step 540, and continues to monitor the various outgoing call legs for answering and determine if the no answer time has expired (step 550).

When the no answer time period has expired in step 550, the method proceeds to step 570 and releases any and all remaining unanswered outgoing call legs. Following step 570 or default step 575, or when there are no more remaining outgoing call legs to be monitored in step 560, the method may end, return step 580.

In addition to the methodology illustrated in FIG. 5, other equivalent variations are available. For example, rather than connecting each answered outgoing call leg to the incoming call leg as they are being answered, alternatively all answered outgoing call legs may be connected to the incoming call leg at about the same time, such as following the expiration of the no answer time parameter. Also in addition, numerous equivalent alternatives for conference session termination are available, such as releasing individual outgoing call legs as each participant terminates the outgoing call leg (goes on-hook), or releasing all outgoing call legs when one (or more) incoming or outgoing call legs have been terminated. For example, the method may maintain the bridge connection to conference members even after the coordinator goes on-hook (hangs up), with the switch or conference bridge directed to terminate the conference session only upon the penultimate remaining call leg (of the multiple call legs forming the multiple leg telecommunication conferencing session) going on-hook. Numerous other equivalent variations of these methodologies may be apparent to those skilled in telecommunications arts.

It should also be understood that, in accordance with the spirit and scope of this invention, the current method may include steps necessary to incorporate any or all of the related inventions, such as controlling the start of alerting as disclosed in the first related application, for processing and routing the outgoing call legs for concurrent alerting.

Numerous advantages of the present invention may be readily apparent from the above discussion. First, once an alerting group (or primary DN) has been configured to include a conference mode, no advance system reservations or notifications are required to create a conference call. Second, other than the person who places the incoming call leg to the primary DN, the conference participants only need to answer their respective outgoing call legs, and do not each need to dial into a pre-arranged, reserved conference bridge. Third, all conference participants may be alerted together and alerted concurrently, rather than alerted individually and sequentially, with each participant individually joined into the conference. In addition, such conferencing of all outgoing call legs is performed automatically, without user involvement or intervention. Lastly, the conference participants may utilize pre-existing customer premise or mobile telecommunication equipment, and specialized or proprietary customer premise equipment is not required for this conferencing feature.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

We claim:

1. A method for telecommunication conferencing in a multiple leg telecommunication session, the method comprising:

receiving an incoming call leg at a switching center as the result of a person placing the incoming call leg to a primary directory number, the incoming call leg designating the primary directory number;

determining a plurality of secondary directory numbers associated with the primary directory number;

processing and routing an outgoing call leg associated with each secondary directory number of the plurality of secondary directory numbers to form a plurality of outgoing call legs;

monitoring the plurality of outgoing call legs for a plurality of answering events; and connecting outgoing call legs associated with the plurality of answering events to the incoming call leg for a multiple leg telecommunication conferencing session;

continuing to alert an unanswered outgoing call leg, of the plurality of outgoing call legs, until a predetermined period of time has elapsed;

when the predetermined period of time has elapsed, releasing any outgoing call leg, of the plurality of outgoing call legs, which has remained unanswered;

when a second predetermined period of time has elapsed during the multiple leg telecommunication conferencing session, the switching center processing and routing a second outgoing call leg to a corresponding secondary directory number associated with a previously unanswered outgoing call leg;

monitoring answering of the second outgoing call leg; and when the second outgoing call leg has been answered, connecting the second outgoing call leg to the incoming call leg for the multiple leg telecommunication conferencing session.

2. The method of claim 1, further comprising:
when the second outgoing call leg has not been answered prior to an expiration of a third predetermined period of time, releasing the second outgoing call leg.

3. The method of claim 1, wherein the predetermined period of time is determined from a no answer time parameter.

4. The method of claim 1, further comprising:
terminating the multiple leg telecommunication conference session upon termination of the incoming call leg.

5. The method of claim 1, further comprising:
terminating the multiple leg telecommunication conference session upon termination of a penultimate call leg remaining from a plurality of call legs forming the multiple leg telecommunication conferencing session.

6. A method for telecommunication conferencing in a multiple leg telecommunication session, the method comprising:
receiving an incoming call leg as the result of a person placing the incoming call leg to a primary directory number, the incoming call leg designating the primary directory number;

determining a plurality of secondary directory numbers associated with the primary directory number;

differentially processing and routing each outgoing call leg associated with each secondary directory number of the plurality of secondary directory numbers to provide concurrent alerting of a corresponding plurality of outgoing call legs;

monitoring the plurality of outgoing call legs for a plurality of answering events; and, connecting outgoing call legs associated with the plurality of answering events to the incoming call leg for a multiple leg telecommunication conferencing session.

7. The method of claim 6, further comprising:
terminating the multiple leg telecommunication conference session upon termination of the incoming call leg.

8. The method of claim 6, further comprising:
terminating the multiple leg telecommunication conference session upon termination of a penultimate call leg remaining from a plurality of call legs forming the multiple leg telecommunication conferencing session.

9. A system for telecommunication conferencing in a multiple leg telecommunication session, the system comprising:
a database having stored in a memory a plurality of secondary directory numbers associated with a primary directory number which is designated when a person places a call; and a switching center coupled to the database, the switching center having an interface for receiving an incoming call leg designating the primary directory number and for processing and routing each outgoing call leg associated with each secondary directory number of the plurality of secondary directory numbers to form a plurality of outgoing call legs, and wherein the switching center includes instructions to monitor the plurality of outgoing call legs for a plurality of answering events, to connect outgoing call legs associated with the plurality of answering events, to the incoming call leg for a multiple leg telecommunication conferencing session, when the predetermined period of time has elapsed, to release any outgoing call leg, of the plurality of outgoing call legs, which has remained unanswered, and, when a second predetermined period of time has elapsed, to process and route a second outgoing call leg to a corresponding secondary directory number associated with a previously unanswered outgoing call leg; to monitor answering of the second outgoing call leg; and when the second outgoing call leg has been answered, to connect the second outgoing call leg to the incoming call leg for the multiple leg telecommunication conferencing session.

10. The system of claim 9, wherein the switching center includes further instructions to terminate the multiple leg telecommunication conference session upon termination of the incoming call leg.

11. The system of claim 9, wherein the switching center includes further instructions to terminate the multiple leg telecommunication conference session upon termination of a penultimate call leg remaining from a plurality of call legs forming the multiple leg telecommunication conferencing session.

12. The system of claim 9, wherein the database comprises a home location register.

13. The system of claim 12, wherein the switching center comprises a mobile switching center.

14. The system of claim 9, wherein the switching center includes further instructions, when the second outgoing call leg has not been answered prior to an expiration of a third predetermined period of time, to release the second outgoing call leg.

15. A system for telecommunication conferencing in a multiple leg telecommunication session, the system comprising:
a database having stored in a memory a plurality of secondary directory numbers associated with a primary directory number which is designated when a person places a call; and a switching center coupled to the database, the switching center having an interface for receiving an incoming call leg designating the primary directory number and for differentially process and route each outgoing call leg associated with each secondary directory number of the plurality of secondary directory numbers to provide concurrent alerting of a corresponding plurality of outgoing call legs, and wherein the switching center includes instructions to monitor the plurality of outgoing call legs for a plurality of answering events and to connect outgoing call legs associated with the plurality of answering events, to the incoming call leg for a multiple leg telecommunication conferencing session.

16. The system of claim 15, wherein the switching center includes further instructions to terminate the multiple leg telecommunication conference session upon termination of the incoming call leg.

17. The system of claim 15, wherein the switching center includes further instructions to terminate the multiple leg telecommunication conference session upon termination of a penultimate call leg remaining from a plurality of call legs forming the multiple leg telecommunication conferencing session.

18. The system of claim 15, wherein the database is a home location register.

19. The system of claim 15, wherein the switching center is a mobile switching center.

20. An apparatus for telecommunication conferencing in a multiple leg telecommunication session, the apparatus comprising:
a network interface for reception of an incoming call leg as the result of a person placing the incoming call leg to a primary directory number, the incoming call leg designating the primary directory number and for transmission of an outgoing call leg;
a memory, the memory storing a plurality of secondary directory numbers associated with the primary directory number; and
a processor coupled to the network interface and to the memory, the processor including instructions to process and route each outgoing call leg associated with each secondary directory number of the plurality of secondary directory numbers to form a plurality of outgoing call legs; the processor including further instructions to monitor the plurality of outgoing call legs for a plurality of answering events, to connect outgoing call legs associated with the plurality of answering events, to the incoming call leg for a multiple leg telecommunication conferencing session, and when a second predetermined period of time has elapsed, to process and route a second outgoing call leg to a corresponding secondary directory number associated with a previously unanswered outgoing call leg; to monitor answering of the second outgoing call leg; and when the second outgoing call leg has been answered, to connect the second outgoing call leg to the incoming call leg for the multiple leg telecommunication conferencing session.

21. The apparatus of claim 20, wherein the processor includes further instructions to terminate the multiple leg telecommunication conference session upon termination of the incoming call leg.

22. The apparatus of claim 20, wherein the processor includes further instructions to terminate the multiple leg telecommunication conference session upon termination of a penultimate call leg remaining from a plurality of call legs forming the multiple leg telecommunication conferencing session.

23. The apparatus of claim 20, wherein the processor includes further instructions, when the second outgoing call leg has not been answered prior to an expiration of a third predetermined period of time, to release the second outgoing call leg.

24. An apparatus for telecommunication conferencing in a multiple leg telecommunication session, the apparatus comprising:
a network interface for reception of an incoming call leg as the result of a person placing the incoming call leg to a primary directory number, the incoming call leg designating the primary directory number and for transmission of an outgoing call leg;
a memory, the memory storing a plurality of secondary directory numbers associated with the primary directory number; and
a processor coupled to the network interface and to the memory, the processor including instructions to differentially process and route each outgoing call leg associated with each secondary directory number of the plurality of secondary directory numbers to provide concurrent alerting of a corresponding plurality of outgoing call legs; the processor including further instructions to monitor the plurality of outgoing call legs for a plurality of answering events, and to connect outgoing call legs associated with the plurality of answering events, to the incoming call leg for a multiple leg telecommunication conferencing session.

25. The apparatus of claim 24, wherein the processor includes further instructions to terminate the multiple leg telecommunication conference session upon termination of the incoming call leg.

26. The apparatus of claim 24, wherein the processor includes further instructions to terminate the multiple leg telecommunication conference session upon termination of a penultimate call leg remaining from a plurality of call legs forming the multiple leg telecommunication conferencing session.

27. A system for telecommunication conferencing in a multiple leg telecommunication session, the apparatus comprising:
a home location register having stored in a memory a plurality of secondary directory numbers and a conference parameter associated with a pilot directory number;
a mobile switching center coupled to the home location register, the mobile switching center further having an interface for receiving an incoming call leg as the result of a person placing the incoming call leg to a primary directory number, the incoming call leg designating the pilot directory number, for determining whether the pilot directory number and its associated plurality of secondary directory numbers are configured for a conference mode, and when configured for the conference mode, for processing and routing an outgoing call leg associated with each secondary directory number to form a plurality of outgoing call legs, the mobile switching center including instructions to monitor the plurality of outgoing call legs for a plurality of answering events; and
a conference bridge coupled to the mobile switching center, the conference bridge including instructions to connect a plurality of outgoing call legs associated with the plurality of answering events to the incoming call leg for a multiple leg telecommunication conferencing session, wherein the mobile switching center includes further instructions, when a second predetermined period of time has elapsed, to process and route a second outgoing call leg to a corresponding secondary directory number associated with a previously unanswered outgoing call leg; to monitor answering of the second outgoing call leg; and when the second outgoing call leg has been answered, to direct the conference bridge to connect the second outgoing call leg to the incoming call leg for the multiple leg telecommunication conferencing session, and wherein the mobile switching center includes further instructions, when the second outgoing call leg has not been answered prior to an expiration of a third predetermined period of time, to release the second outgoing call leg.

28. The system of claim 27, wherein upon reception of a LocationRequest containing the pilot directory number, the home location register transmits an ANSI-41 compatible LocationRequest RETURN RESULT to the mobile switching center, the ANSI-41 compatible LocationRequest RETURN RESULT containing a listing of each secondary directory number, the conference parameter, and corresponding routing, answering and terminating parameters for each secondary directory number.

29. A system for telecommunication conferencing in a multiple leg telecommunication session, the apparatus comprising:
 a home location register having stored in a memory a plurality of secondary directory numbers and a conference parameter associated with a pilot directory number;
 a mobile switching center coupled to the home location register, the mobile switching center further having an interface for receiving an incoming call leg as the result of a person placing the incoming call leg to a primary directory number, the incoming call leg designating the pilot directory number, for determining whether the pilot directory number and its associated plurality of secondary directory numbers are configured for a conference mode, and when configured for the conference mode, for processing and routing an outgoing call leg associated with each secondary directory number to form a plurality of outgoing call legs, the mobile switching center including instructions to monitor the plurality of outgoing call legs for a plurality of answering events, and instructions to differentially process and route each outgoing call leg associated with each secondary directory number of the plurality of secondary directory numbers to provide concurrent alerting of the plurality of outgoing call legs; and the plurality of answering events to the incoming call leg for a multiple leg telecommunication conferencing session.

30. The system of claim 29, wherein upon reception of a LocationRequest containing the pilot directory number, the home location register transmits an ANSI-41 compatible LocationRequest RETURN RESULT to the mobile switching center, the ANSI-41 compatible LocationRequest RETURN RESULT containing a listing of each secondary directory number, the conference parameter, and corresponding routing, answering and terminating parameters for each secondary directory number.

* * * * *